United States Patent
Nuggehalli et al.

(10) Patent No.: US 8,310,703 B2
(45) Date of Patent: Nov. 13, 2012

(54) PRINTING AND SCANNING WITH CLOUD STORAGE

(75) Inventors: Jayasimha Nuggehalli, Cupertino, CA (US); Jiang Hong, San Jose, CA (US); Zhenyu Lu, Sunnyvale, CA (US)

(73) Assignee: Ricoh Company, Ltd, Tokyo (JP)

( * ) Notice: Subject to any disclaimer, the term of this patent is extended or adjusted under 35 U.S.C. 154(b) by 697 days.

(21) Appl. No.: 12/476,024

(22) Filed: Jun. 1, 2009

(65) Prior Publication Data

US 2010/0302579 A1 Dec. 2, 2010

(51) Int. Cl.
*G06F 15/00* (2006.01)
(52) U.S. Cl. ...................................... 358/1.15
(58) Field of Classification Search ............... 358/1.15
See application file for complete search history.

(56) References Cited

U.S. PATENT DOCUMENTS

| 6,748,471 | B1 | 6/2004 | Keeney |
| 2006/0165459 | A1* | 7/2006 | Ishii ............................... 400/62 |
| 2010/0299520 | A1* | 11/2010 | Murakawa ..................... 713/156 |

FOREIGN PATENT DOCUMENTS

EP 1852748 A1 7/2007

* cited by examiner

*Primary Examiner* — Saeid Ebrahimi Dehkordy
(74) *Attorney, Agent, or Firm* — Duft Bornsen & Fishman, LLP (57) ABSTRACT

Methods and system for printing a print job with cloud storage are disclosed. A web print server is provided for accessing a cloud storage server. The web print server is operable to download a print job from the cloud storage server to the web print server. The web print server downloads the print job based on an identification (of the print job) that is received from a web client remotely over a network. Subsequently, the print web server sends the print job to a printer for the print job to be printed from the printer. In one embodiment, the printer may comprise the web client.

16 Claims, 4 Drawing Sheets

PRINTING AND SCANNING WITH CLOUD STORAGE

BACKGROUND

1. Field of the Invention

The invention relates generally to print environments and more specifically relates to printing and scanning with cloud storage.

2. Discussion of Related Art

Print spooling as known in the art has enabled multiple client computers to share a printer by allowing print jobs generated from the client computers to be first stored at a spooling server, and then to be printed on the printer in an orderly fashion from the spooling server. Each of the print jobs is typically deleted by the spooling server automatically after the print job is printed on the printer. However, users have demanded to gain greater control over their print jobs. For example, a user may wish to reprint a print job any number of times at any time. Another user may wish to maintain a history of print jobs for future reference. Yet another user may wish to allow others to print the user's print job.

However, maintaining the print jobs would put enormous strain on the existing information technology infrastructure. Because the print jobs may be stored indefinitely, additional storage capacities need to be added. Adding the additional storage capacities represents not only additional up-front capital expenditures in additional equipment, but also additional personnel resources to set up and maintain the additional equipment. Planning for adding the additional storage capacities is also problematic with the risk of either over investment resulting in excess capacity or under investment resulting in insufficient capacity.

Meanwhile, a multi-function peripheral ("MFP") that includes printing capabilities may need to be updated to allow the users to gain greater control over their print jobs at the MFP. However, capabilities of an MFP are typically embedded within the MFP during manufacturing, and adding new capabilities would result in costly field upgrades. Likewise, each of the client computers used by the users may also need to be updated so that print jobs generated by the client computers can be stored in a manner different from print spooling.

Thus there is a general need in the art to provide users with greater control over their print jobs.

SUMMARY

Embodiments described herein provide methods and systems for printing and scanning jobs in conjunction with cloud storage. Cloud storage, which is provided through a cloud storage server by an Internet-based service provider, is used to store print jobs. Unlike spooling servers, the cloud storage server does not automatically delete a print job after the print job is downloaded from the cloud storage server. Accordingly, a user is able to maintain a history of print jobs and reprint a print job any number of times. Additionally, cloud storage alleviates the need for up-front investments because the Internet-based service provider typically charges for the amount of storage usage on an on-going basis. To support the use of cloud storage, a web print server is provided so that capabilities for accessing the cloud storage server do not need to be embedded in an MFP. The web print server is operable to download a print job from the cloud storage server to the web print server. The print job is downloaded by the web print server based on an identification (of the print job) that is received from a web client remotely over a network. Subsequently, the print web server sends the print job to a printer for the print job to be printed from the printer. In some embodiments, the printer may comprise the web client that initiates a request to the web print server.

In one embodiment, a method for printing a print job includes receiving an identification of the print job at a print web server from a web client, in that the web client accesses the print web server remotely over a network. The method also includes downloading the print job from a cloud storage server to the print web server based on the identification of the print job, in that the cloud storage server does not automatically delete the print job after the print job is downloaded to the print web server. Additionally, the method includes sending the print job from the print web server to a printer for the print job to be printed on the printer.

In another embodiment, a system for printing a print job includes a print web server operable to receive an identification of the print job from a web client, in that the web client accesses the print web server remotely over a network, and in that the print web server is further operable to download the print job from a cloud storage server based on the identification of the print job. The system also includes a printer operable to receive the print job from the print web server for the print job to be printed.

Yet another exemplary embodiment provides a computer readable medium tangibly embodying programmed instructions which, when executed by a computer system, are operable to execute a method of uploading a print job to a cloud storage server. The method includes listening on a print port and receiving the print job through the print port from a client computer. The method also includes identifying print job information and identifying the cloud storage server. Additionally, the method includes uploading the print job to the cloud storage server and storing the print job information.

BRIEF DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements, modifications, alternative constructions, and equivalents that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
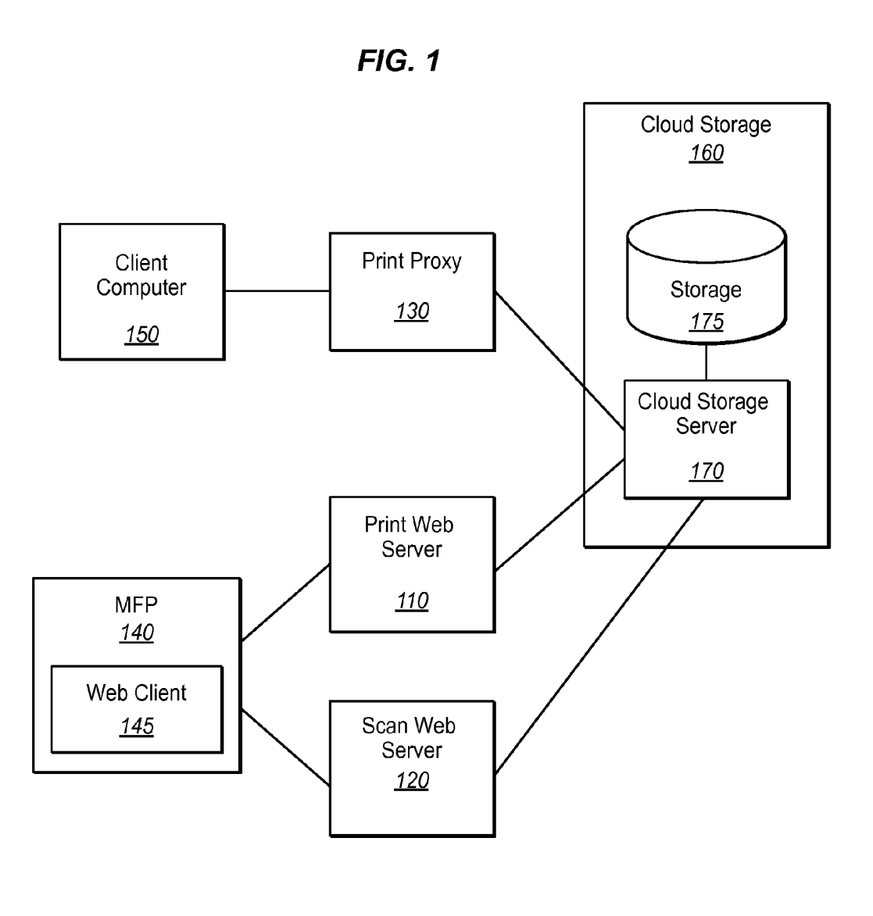
FIG. 1 illustrates a system for printing a print job in an exemplary embodiment.

FIG. 1 illustrates a system for printing a print job in an exemplary embodiment. A client computer 150 is in communication with a print proxy 130. The client computer 150 may comprise any computer or device capable of generating a print job to be printed over a network. For example, a network printer may be added/configured in the operating system of the client computer 150 such that a print job can be sent to a print port (e.g., port 9100) and the Internet Protocol ("IP") address of the print proxy 130. The print proxy 130 may comprise any software, circuitry, computer, and/or device capable of receiving the print job from the client computer 150 over the network. For example, the print proxy 130 may comprise software running on a server that listens on the print port and receives the print job. The network between the client computer 150 and the print proxy 130 may comprise a TCP/IP network and the print job may be communicated using any of a number of suitable protocols including Internet Printing Protocol ("IPP"), among others.

The print proxy 130 is in communication with a cloud storage server 170. The cloud storage server 170 may be supported by an Internet-based service provider including one of Amazon S3, Nirvanix, and DocumentMall, among others. The cloud storage server 170 provides cloud storage by accepting one or more standard web-based communication protocols for storing and retrieving files. For example, the File Transfer Protocol ("FTP") may be used to upload a file to the cloud storage server 170, and the Hypertext Transfer Protocol ("HTTP") may be used to download a file from the cloud storage server 170. It is noted that the cloud storage server 170 may in fact comprise any of a number of servers located at different geographical areas as configured by the Internet-based service provider for load balancing and/or improving availability. Because the cloud storage server 170 resides in the Internet, the print proxy 130 may need to access the cloud storage server 170 through a firewall. Accordingly, besides being capable of receiving the print job from the client computer 150 over the network, the print proxy 130 may also be capable of uploading the print job through a firewall over the Internet to the cloud storage server 170.

Cloud storage 160 may generally be seen as including the cloud storage server 170 and storage 175. Cloud storage 160 generally encompasses the concept of providing/delivering data storage as a service, with the customer being billed for the amount of storage usage under a utility computing model (similar to traditional public utilities including electricity). Although files that are stored in cloud storage 160 reside on the storage 175 (e.g., the storage 175 may include multiple hard drives), customers generally need not be concerned with managing or addressing the storage 175. Rather, the storage 175 is managed by the Internet-based service provider and details about the storage 175 are hidden away by making standard web-based communication protocols available to the customer through the cloud storage server 170.

Another way to add a print job to cloud storage 160 may be by using a scanner. An MFP 140 that includes scanning capabilities may be in communication with a scan web server 120 for sending scanned data to the scan web server 120 over a network. The network may comprise a TCP/IP network and/or the Internet, and the scan web server 120 may reside either inside or outside a firewall. Besides scanning capabilities, the MFP 140 may also include capabilities such as printing, faxing, and photocopying, among others. The printing capabilities may include color and/or black and white printing. Indeed, the word "MFP" may be read as multi-function peripheral, multi-function printer, or multi-function product.

It is noted that a standalone scanner (that may include a web client) may also be in communication with the scan web server 120 in a manner similar to the MFP 140. The MFP 140 may include a web client 145 to allow a user to interact with the scan web server 120. For example, the web client 145 may comprise a web browser including Internet Explorer, Firefox, or Opera, among others. The web client 145 may have been configured to open a web page provided by the scan web server 120 for configuring scanning parameters. For example, rather than having firmware embedded in the MFP 140 to provide a user interface to change scanning resolution, the web client 145 may provide the user interface by displaying a web page (e.g., on a display panel of the MFP 140) received from the scan web server 120.

After the user is satisfied with a set of scanning parameters, the user may begin scanning a document by pressing a button on a web page displayed by the web client 145. The web client 145 may then send an HTTP request that may include the set (or a subset) of scanning parameters back to the scan web server 120. (It is noted that the web client 145 may communicate scanning parameters relating to resolution, image quality, etc directly to the MFP 140.) The scan web server 120 may in turn communicate with the web client 145 and/or another portion of the MFP 140 to begin scanning the document. Subsequently, the MFP 140 may send scanned data to the scan web server 120 for processing. Accordingly, the scan web server 120 may comprise any software, circuitry, computer, and/or device capable of acting as a web server and providing web pages/web responses.

The scan web server 120 may process the scanned data to generate a print job. The scan web server 120 may also be in communication with the cloud storage server 170 to upload the generated print job to the cloud storage server 170. Because the cloud storage server 170 resides in the Internet, the scan web server 120 may need to access the cloud storage server 170 through a firewall. However, the scan web server 120 and the cloud storage server 170 may both reside in the Internet without being separated by a firewall. In some embodiments, the scan web server 120 may be provided as a cloud application under a utility computing model similar to cloud storage 160. Accordingly, besides being capable of acting as a web server and receiving scanned data from the MFP 140 over the network, the scan web server 120 may also be capable of uploading the print job over the Internet to the cloud storage server 170.

The print jobs stored in cloud storage 160 may be printed through a print web server 110. The MFP 140 that includes printing capabilities may be in communication with the print web server 110 over a network. The network may comprise a TCP/IP network and/or the Internet, and the print web server 110 may reside either inside or outside a firewall. It is noted that a standalone printer (that may include a web client) may also be in communication with the print web server 110 in a manner similar to the MFP 140. Likewise, the client computer 150 (that may include a web client) may also be in communication with the print web server 110 in a manner similar to the MFP 140. As noted above, the MFP 140 includes the web client 145. The web client 145 (or another web client running on the client computer 150) allows a user to interact with the print web server 110. The web client 145 may have been configured to open a web page provided by the print web server 110 for displaying a list of print jobs, and allowing the user to select a print job to be printed.

The web client 145 may also be configured with a default printer. For example, the default printer of the web client 145 residing in the MFP 140 may comprise the printing capabilities of the MFP 140. The user may also be able to configure and store a default printer on the print web server 110. For example, when a web client running on the client computer 150 is connected to the print web server 110, the print web server 110 may be provided with an identification of the user. The print web server 110 may then identify the default printer for the user based on the identification of the user. Accordingly, the user may be able to select a printer either as a destination for printing a particular print job, or to select a printer to be stored as the default printer.

After selecting the print job to be printed, the user may initiate printing the print job by pressing a button on a web page displayed by the web client 145. The web client 145 may send an HTTP request that may include an identification of the print job back to the print web server 110. In response to the printing request, the print web server 110 may download the print job from the cloud storage server 170 based on the identification of the print job. Because the cloud storage server 170 resides in the Internet, the print web server 110 may need to access the cloud storage server 170 through a firewall. However, the print web serve 110 and the cloud storage server 170 may both reside in the Internet without being separated by a firewall. In some embodiments, the print web server 110 may be provided as a cloud application under a utility computing model similar to cloud storage 160. Accordingly, the print web server 110 may comprise any software, circuitry, computer, and/or device capable of acting as a web server and providing web pages/web responses. Additionally, the print the print web server 110 may also be capable of downloading the print job over the Internet from the cloud storage server 170.

Subsequently, the print web server 110 may send the downloaded print job to the web client 145 to be printed on the MFP 140 in some embodiments. It is noted that in these embodiments, the print job may not be sent directly from the print web server 110 to the printing capabilities of the MFP 140. Rather, the web client 145 running on the MFP 140 may first receive the print job (as a response to the printing request by the print web server 110), and then redirect the print job from the web client 145 to the printing capabilities of the MFP 140. In certain embodiments, the web client 145 may communicate with the printing capabilities of the MFP 140 using network protocols. In one instance, the web client 145 may communicate with the printing capabilities of the MFP 140 through a loopback address (e.g., 127.0.0.1 for IPv4). In another instance, the web client may not reside in the MFP 140 (e.g., the web client may reside in the client computer 150). Accordingly, the web client is provided with information about the printer to print the print job on and/or how to communicate with to the printer through a network. The printer may be the default printer or the printer selected by the user discussed above. Indeed, in these embodiments, sending the print job from the print web server to the printer is performed indirectly through the web client. In another embodiment, the print web server 110 may send the print job directly to the printing capabilities of the MFP 140.

Those of ordinary skill in the art will readily recognize numerous additional and equivalent components and modules within a fully functional system. Such additional and equivalent components are omitted herein for simplicity and brevity of this discussion. Thus, the structures of FIG. 1 are intended merely as representatives of exemplary embodiments.

Figure 2:
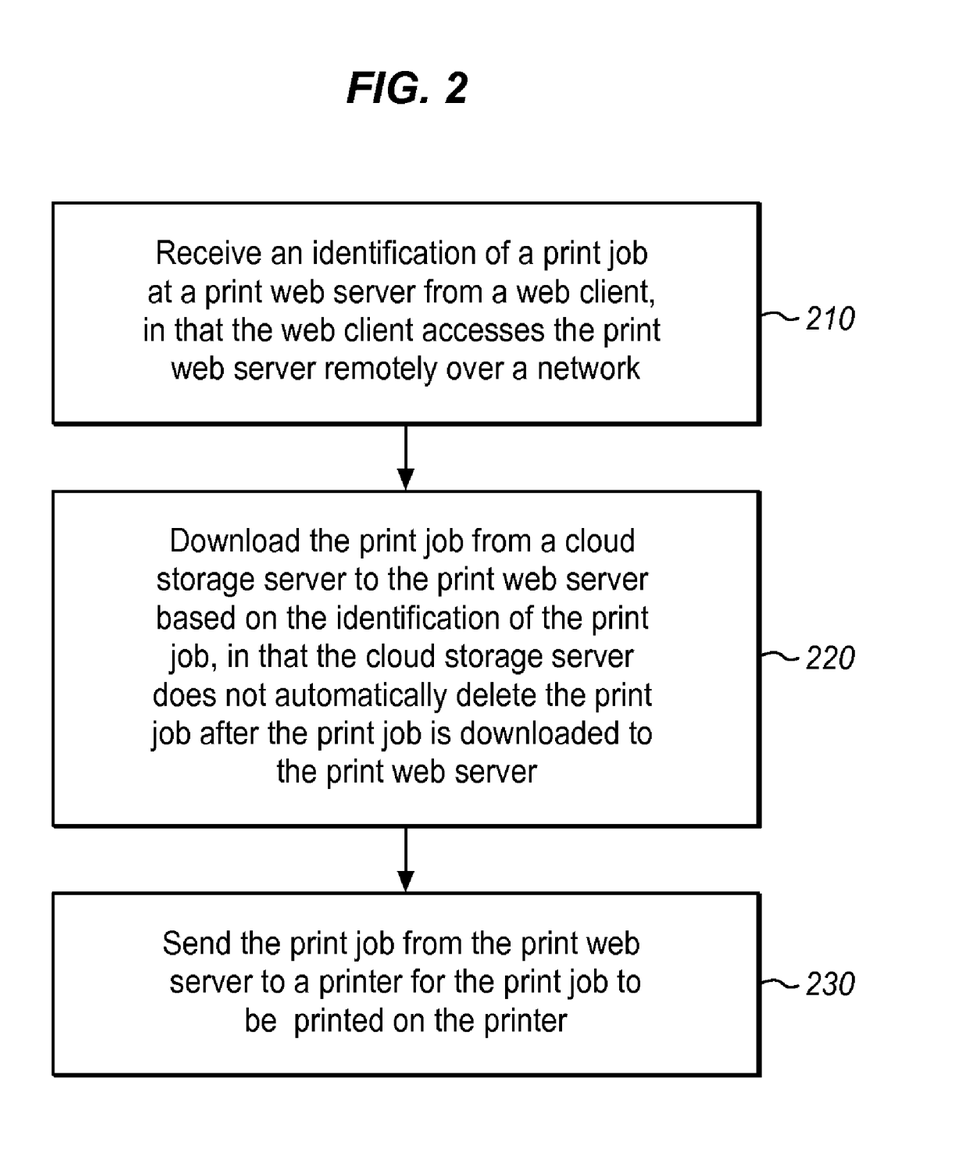
FIG. 2 illustrates a high level flow chart for printing a print job in an exemplary embodiment.

FIG. 2 illustrates a high level flow chart for printing a print job in an exemplary embodiment. The method described herein may be operable in, for example, the system of FIG. 1. In step 210, a print web server receives an identification of a print job from a web client, in that the web client accesses the print web server remotely over a network. A user who wishes to print the print job may have used the web client to send a printing request that includes the identification of the print job. The identification of the print job may comprise a path and/or an identification code.

In step 220, the print web server downloads the print job from a cloud storage server to the print web server based on the identification of the print job. For example, the print web server may download the print job as a file from the cloud storage server using the HTTP protocol by specifying the path and/or the identification code of the file. It is noted that the cloud storage server does not automatically delete the print job after the print job is downloaded to the print web server as would be common for a spooling server.

In step 230, the print web server sends the print job to a printer (e.g., for color and/or black and white printing, which may comprise the printing capabilities of an MFP) for the print job to be printed on the printer. For example, the print job may be received by the web client, which then redirects the print job to the printer. In some embodiments, the printer includes the web client, and the web client may send the print job to the printer (which may comprise the printing capabilities of an MFP) through a loopback address.

Figure 3:
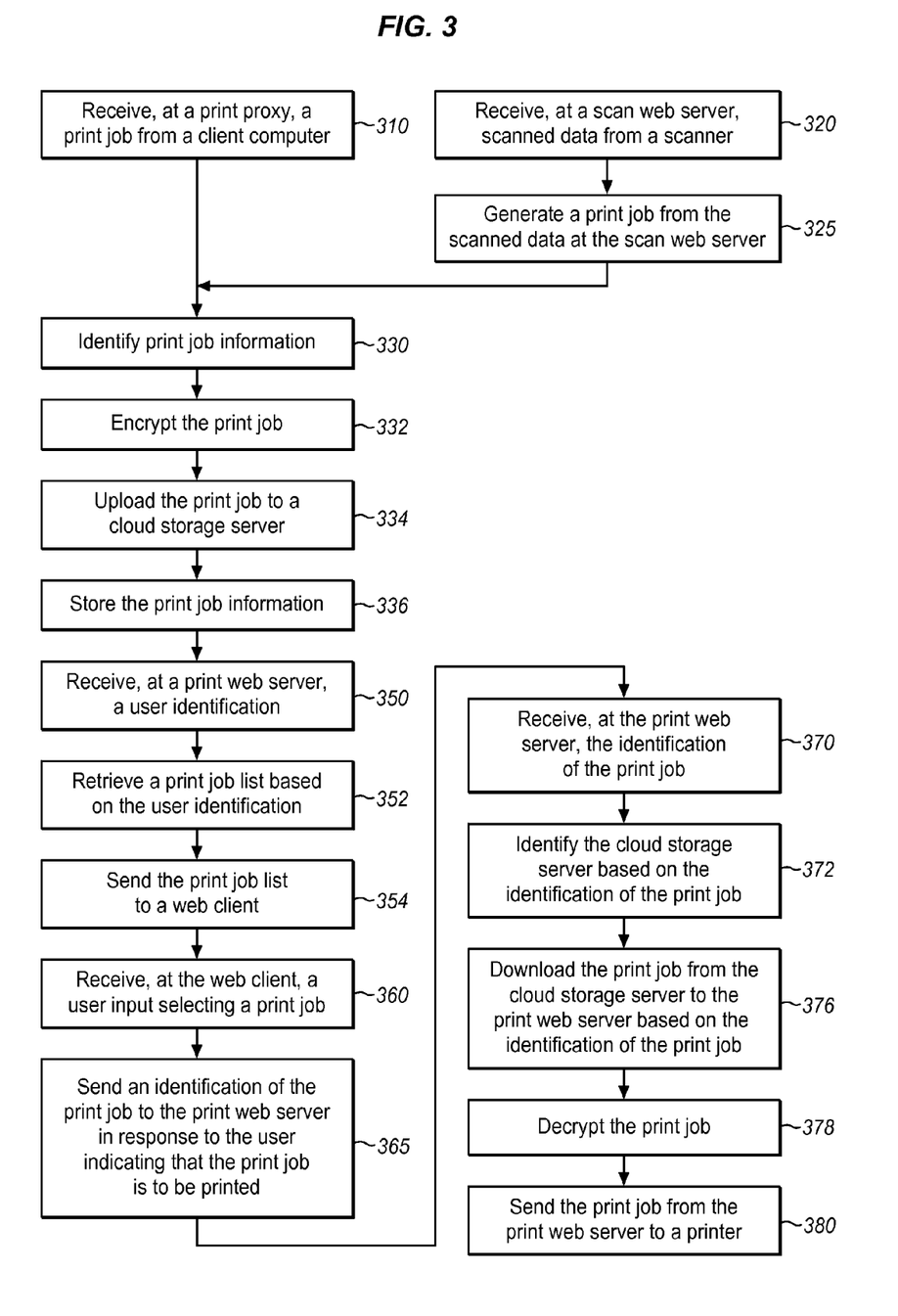
FIG. 3 illustrates a flow chart for printing a print job in an exemplary embodiment.

FIG. 3 illustrates a flow chart for printing a print job in an exemplary embodiment. The method described herein may be operable in, for example, the system of FIG. 1. In step 310, a print proxy receives a print job from a client computer. The print proxy may have listened on a print port, waiting to receive print jobs. The print job may have been generated on the client computer when a user wishes to print to cloud storage. Beneficially, the client computer only needs to have been configured (e.g., in its operating system) with a printer that prints to the print proxy without needing to install special driver or software to upload the print job to cloud storage. Instead, only the print proxy needs to be configured to upload the print job to cloud storage. As a result, installation and administrative efforts are greatly reduced.

In step 320, a scan web server receives scanned data from a scanner. As noted above, a user may have used a web client to configure scanning parameters, and have pressed a button on a web page displayed by the web client to begin scanning a document. Additionally, the web client may have sent an identification (e.g., a computer user name) of the user to the scan web server. In response to the scanning request, the scan web server may have communicated with the web client and/or another portion of the scanner to begin scanning the document. The scanned data is sent from the scanner to the scan web server. The scanned data may have been received as one image per scanned page. Each image may have been sent as a single file using a file format including one of Tagged Image File Format ("TIFF"), Joint Photographic Experts Group ("JPEG"), and Portable Document Format ("PDF"), among others.

In step 325, the scan web server generates a print job from the scanned data. The print job may be generated by converting the scanned data and/or combining the scanned data. For example, based on the scanning parameters (e.g., image type information), the scan web server may convert a TIFF scanned data file to PDF, or convert a JPEG scanned data file to PDF. The print job may also comprise a PDF document that combines and includes images of all scanned pages. Alternatively or in addition, the scanned data may be converted into another printer descriptions language including Printer Command Language ("PCL"), among others.

In step 330, print job information is identified by either the print proxy or the scan web server. For example, the print job information may be identified by the print proxy based on information transmitted as part of the printing protocol and/or the print job. Similarly, the print job information may be identified by the scan web server based on the information provided by the web client and/or the scanned data. The print job information may include one or more of the following: the user's name (or a computer user name), the user's password, a job name (e.g., obtained from a Print Job Language command), the time that the print job is generated, a size of the print job, and a page count of the print job. Additionally, the cloud storage service (i.e., one of Amazon S3, Nirvanix, and DocumentMall, among others) and/or the corresponding cloud storage server to be used for storing the print may be identified. For example, the cloud storage may be identified based on the identification of the user, and/or the size of the print job. Alternatively or in addition, the cloud storage may be identified based on a configuration file associated with the print proxy.

In step 332, the print job may optionally be encrypted prior to uploading the print job to the cloud storage server. For example, if the print job comprises a PDF file, the PDF file may be encrypted. In step 334, the print job is uploaded to the cloud storage server. It is noted that a unique identification may have been identified or generated for the print job. For example, the unique identification may be generated based on the time (e.g., number of seconds/milliseconds since Jan. 1, 1970) and the user's computer user name. The print job may then be uploaded to the cloud storage server using, for example, the FTP protocol so that the print job can later be downloaded based on the unique identification. Alternatively or in addition, the Simple Object Access Protocol ("SOAP") in conjunction with HTTP, Hypertext Transfer Protocol Secure ("HTTPS"), or Simple Mail Transfer Protocol ("SMTP") and/or any other suitable protocol(s) for providing Webservice may be used. The unique identification is intended to uniquely identify the print job among all print jobs stored in cloud storage.

In step 336, the print job information is stored so that the print job information may be accessible by a print web server. It is noted that the print job information may further include one or more of the following: the unique identification for the print job, the time that the print job is uploaded to the cloud storage server, a number of times that the print job has been printed as zero initially, and the cloud storage service used to store the print job. For example, the print job information may be stored in a database or data repository managed by the print web server in some embodiments. In another embodiment, the print job information may be stored in cloud storage. In yet another embodiment, the print job information may be stored using technologies including network-attached storage ("NAS") and/or storage area network ("SAN").

In step 350, a print web server receives a user identification. The user identification may have been received by a web client that the user uses to interact with the print web server. In some embodiments, the web client may reside in an MFP and may display web pages received from the print web server on a display panel of the MFP. The user identification may comprise a user name (or login) that the user uses to log into the print web server. The user identification may alternatively comprise a user identification other than the one used for login. For example, another user may be allowed to print the user's print job. The user identification may then be sent from the web client to the print web server. For example, the user identification may be received in an HTTP POST request.

In step 352, the print web server retrieves a print job list based on the user identification. As noted above, the print job information stored in step 336 is accessible by the print web server. The print web server may use the user identification as a key to search for print jobs that are associated with the user identification. The list of print jobs that match the user identification is then sent back to the web client in step 354. For example, the print job list may be sent in a HyperText Mark Language ("HTML") form. The web client receives the print job list and displays the print job list in a user interface for the user. In step 360, the web client receives a user input selecting a print job. For example, each print job of the print job list may have been displayed with an associated checkbox or radio button. The user is then able to select only one print job, or a number of print jobs from the print job list.

In step 365, the web client sends an identification of the print job to the print web server in response to the user indicating that the print job is to be printed. For example, the user interface displayed for the user may include a print button. When the user presses the print button, the identification of each print job that has been selected by the user is sent from the web client to the print web server, along with an instruction requesting that the print job(s) to be printed. For example, the identification(s) may be submitted using the form method specified in the HTML form.

The user interface may also include a refresh button. If the user presses the refresh button, the web client may send the user identification to the print web server to receive an updated print job list, in effect returning to step 350 above. The user interface may further include a delete button. If the user presses the delete button, the identification of each print job that has been selected by the user is sent from the web client to the print web server, along with an instruction requesting that the print job(s) to be deleted. Accordingly, the print web server may then delete each selected print job from cloud storage. Indeed, print jobs stored in cloud storage are not deleted automatically so that users have greater control over their print jobs. However, in some embodiments, outdated (e.g., not accessed or downloaded for a long time) print jobs may be removed from cloud storage as part of periodic maintenance performed by or at the web print server. When a print job is deleted from cloud storage, its corresponding print job information is also updated or deleted.

In step 370, the print web server receives the identification of the print job, along with an instruction requesting that the print job to be printed. As noted above, the user may be able to print multiple print jobs. However, printing of only one print job is described for brevity. In step 372, the print web server identifies a cloud storage server based on the identification of the print job. As noted above, the print job information stored in step 336 may be accessible by a print web server. The print web server may use the identification of the print job to identify the print job information associated with the print job, and the print job information may include information about the cloud storage service used to store the print job.

In step 376, the print web server downloads the print job from the cloud storage server based on the identification of the print job. As noted above, the identification of the print job may uniquely identify the print job among all print jobs stored in cloud storage. The print web server may thus download the print job from the identified cloud storage server, for example, using the HTTP protocol. In step 378, the print web server may optionally decrypt the print job after downloading the print job from the cloud storage server. For example, if the print job comprises a PDF file, the PDF file may have been encrypted and may thus be decrypted in step 378.

In step 380, the print web server sends the print job to a printer. As noted above, the print job may be received by the web client, which then redirects the print job to the printer. In some embodiments, the printer includes the web client, and the web client may send the print job to the printer (which may comprise the printing capabilities of an MFP) through a loopback address. Additionally, the print job information associated with the print job may be updated to increment the number of times that the print job has been printed. In some embodiments, the identification of the user who printed the print job may also be stored among the print job information.

Those of ordinary skill in the art will readily recognize numerous additional and equivalent steps that may be performed and/or omitted in the methods of FIGS. 2 and 3. Such additional and equivalent steps are omitted herein merely for brevity and simplicity of this discussion.

Figure 4:
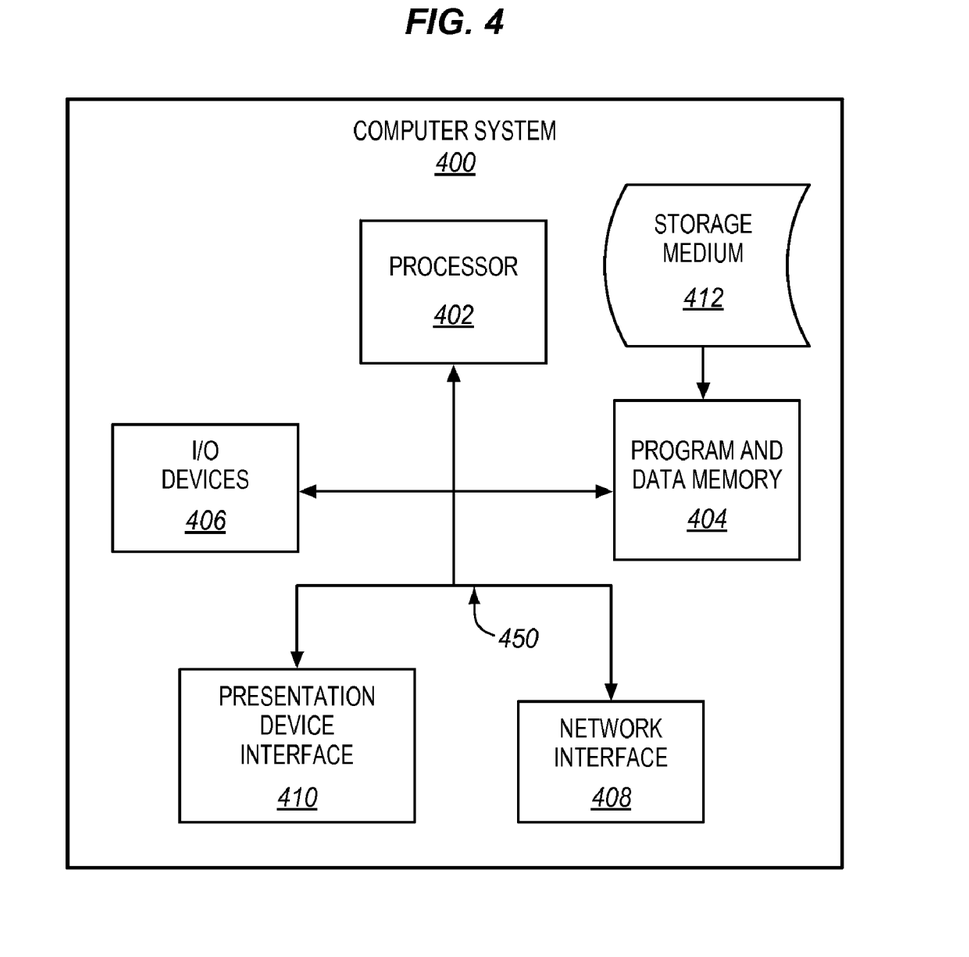
FIG. 4 illustrates a computer system operable to execute computer readable medium embodying programmed instructions to perform desired functions in an exemplary embodiment.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 4 is a block diagram depicting a computer system 400 operable to provide features and aspects hereof by executing programmed instructions and accessing data stored on a computer readable storage medium 412.

Furthermore, embodiments of the invention can take the form of a computer program product accessible from a computer-usable or computer-readable medium 412 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 400 suitable for storing and/or executing program code will include at least one processor 402 coupled directly or indirectly to memory elements 404 through a system bus 450. The memory elements 404 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 406 (including but not limited to keyboards, displays, pointing devices, etc) can be coupled to the system either directly or through intervening I/O control systems. Network adapter interfaces 408 may also be coupled to the system to enable the computer system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 410 may be coupled to the system to interface to one or more presentation device such as printing systems and displays for presentation of presentation data generated by processor 402.

Although specific embodiments were described herein, the scope of the invention is not limited to those specific embodiments. The scope of the invention is defined by the following claims and any equivalents thereof.

We claim:

1. A method for printing a print job at a Multi-Function Printer (MFP), the method comprising:
    transmitting a user identification from a web client executing on the MFP to a print web server, wherein the web client accesses the print web server remotely over a network;
    retrieving, by the web print server, a print job list based on the user identification;
    transmitting, from the print web server to the web client executing on the MFP, the print job list;
    receiving, at the web client executing on the MFP, user input selecting a print job from the print job list for printing at the MFP;
    transmitting, from the web client to the print web server, an identification of the print job selected by the user;
    downloading, by the web server, the print job from a cloud storage server to the print web server based on the identification of the print job;
    receiving, by the MFP, the print job selected by the user from the print web server; and
    printing, by the MFP, the print job selected by the user.

2. The method of claim 1, further comprising:
    identifying, at the print web server, the cloud storage server based on the identification of the print job.

3. The method of claim 1, further comprising:
    decrypting the print job after downloading the print job from the cloud storage server.

4. The method of claim 1, further comprising:
    responding to the user indicating that the print job list is to be refreshed, wherein responding to the user comprises sending a user identification of the user from the web client to the print web server and receiving a print job list corresponding to the user identification.

5. The method of claim 1, further comprising:
    sending, from the web client to the print web server, the identification of the print job and an instruction to delete the print job in response to the user indicating that the print job is to be deleted.

6. The method of claim 1, further comprising:
    receiving the print job at the web client executing on the MFP; and
    sending the print job from the web client to a print port of the MFP through a loopback connection.

7. The method of claim 1, further comprising:
    receiving, at a print proxy, the print job from a client computer; and
    uploading the print job from the print proxy to the cloud storage server.

8. The method of claim 7, further comprising:
    identifying print job information; and
    storing the print job information, wherein the print job information is accessible by the print web server.

9. The method of claim 7, further comprising:
    encrypting the print job prior to uploading the print job to the cloud storage server.

10. The method of claim 1, further comprising:
    receiving scanned data at a scan web server over a network from a scanner;
    generating the print job from the scanned data at the scan web server; and
    uploading the print job from the scan web server to the cloud storage server.

11. The method of claim 10, further comprising:
encrypting the print job prior to uploading the print job to the cloud storage server.

12. The method of claim 10, wherein the printer comprises the scanner.

13. A system for printing a print job at a Multi-Function Printer (MFP), the system comprising:
a print web server; and
a web client executing on a Multi-Function Printer (MFP), the web client operable to transmit a user identification to the print web server, wherein the web client accesses the print web server remotely over a network,
the print web server operable to retrieve a print job list based on the user identification, and to transmit the print job list to the web client executing on the MFP,
the web client further operable to receive user input selecting a print job from the print job list for printing at the MFP, and to transmit an identification of the print job selected by the user to the print web server,
the print web server further operable to download the print job from a cloud storage server based on the identification of the print job,
the MFP further operable to receive the print job from the print web server, and to print the print job.

14. The system of claim 13, the system further comprising:
a print proxy operable to receive the print job from a client computer, and operable to upload the print job from the print proxy to the cloud storage server.

15. The system of claim 13, the system further comprising:
a scan web server operable to receive scanned data over a network from the MFP, operable to generate the print job from the scanned data, and operable to upload the print job to the cloud storage server.

16. A non-transitory computer readable medium embodying programmed instructions which, when executed by a computer system, are operable to execute a method of uploading a print job to a cloud storage server from a Multi-Function Printer (MFP), the method comprising:
listening on a print port of the MFP;
receiving the print job at the MFP through the print port from a client computer;
identifying print job information;
identifying the cloud storage server;
uploading the print job from the MFP to the cloud storage server; and
storing the print job information.

\* \* \* \* \*